United States Patent
Rohrbacher et al.

(10) Patent No.: US 12,087,292 B2
(45) Date of Patent: Sep. 10, 2024

(54) METHOD AND SYSTEM FOR PROVIDING A SPEECH-BASED SERVICE, IN PARTICULAR FOR THE CONTROL OF ROOM CONTROL ELEMENTS IN BUILDINGS

(71) Applicant: Siemens Schweiz AG, Zürich (CH)

(72) Inventors: Kai Rohrbacher, Hünenberg (CH); Oliver Zechlin, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 158 days.

(21) Appl. No.: 16/968,541

(22) PCT Filed: Jan. 15, 2019

(86) PCT No.: PCT/EP2019/050945
§ 371 (c)(1),
(2) Date: Aug. 7, 2020

(87) PCT Pub. No.: WO2019/154598
PCT Pub. Date: Aug. 15, 2019

(65) Prior Publication Data
US 2021/0043332 A1    Feb. 11, 2021

(30) Foreign Application Priority Data
Feb. 9, 2018   (DE) ..................... 10 2018 202 018.3

(51) Int. Cl.
*G10L 15/22*   (2006.01)
*G06F 3/16*    (2006.01)
(Continued)

(52) U.S. Cl.
CPC ............. *G10L 15/22* (2013.01); *G06F 3/167* (2013.01); *G16Y 10/80* (2020.01); *G16Y 40/35* (2020.01);
(Continued)

(58) Field of Classification Search
None
See application file for complete search history.

(56) References Cited

U.S. PATENT DOCUMENTS 8,554,559 B1 * 10/2013 Aleksic .................. G10L 21/00
                                                    704/235
2006/0190263 A1 * 8/2006 Finke ...................... G16H 15/00
                                                    704/E15.026
(Continued)

FOREIGN PATENT DOCUMENTS

| CN | 101518074 A | 8/2009 | ............. H04L 12/28 |
| EP | 3496090 A1 | 6/2019 | ............. G06F 21/62 |
| KR | 20120026465 A | 3/2012 | ............. H04L 12/14 |

OTHER PUBLICATIONS

Search Report for International Application No. PCT/EP2019/050945, 14 pages, Apr. 17, 2019.
(Continued)

*Primary Examiner* — Jonathan C Kim
(74) *Attorney, Agent, or Firm* — Slayden Grubert Beard PLLC

(57) ABSTRACT

Various embodiments of the teachings herein include methods and systems for providing a speech-based service for the control of room control elements in buildings. Speech instructions are received by means of an audio device. The audio device is configured to analyze the received speech instructions, to convert them into corresponding operating commands for room control elements for the control of, in particular, HVAC devices (e.g. field devices) in a building and to pass them on to the corresponding room control elements. Before the receipt of the speech instructions by the audio device, the identity of the sender (user) of the speech instructions is anonymized by means of an anonymization service.

8 Claims, 3 Drawing Sheets

(51) Int. Cl.
*G06F 21/62* (2013.01)
*G16Y 10/80* (2020.01)
*G16Y 40/35* (2020.01)

(52) U.S. Cl.
CPC .... *G06F 21/6254* (2013.01); *G10L 2015/223* (2013.01); *G10L 2015/227* (2013.01)

(56) References Cited

U.S. PATENT DOCUMENTS

| | | | |
|---|---|---|---|
| 2007/0178884 A1 | 8/2007 | Donovan et al. | 455/411 |
| 2009/0018820 A1* | 1/2009 | Sato | G06F 40/289 |
| | | | 704/9 |
| 2009/0265217 A1 | 10/2009 | Aurenz | 709/218 |
| 2010/0039218 A1 | 2/2010 | Cohen et al. | 340/5.8 |
| 2011/0041061 A1* | 2/2011 | Cohen | G06Q 10/107 |
| | | | 726/26 |
| 2011/0077946 A1* | 3/2011 | Shectman | G10L 17/00 |
| | | | 704/E21.001 |
| 2013/0289984 A1* | 10/2013 | Hakkani-Tur | G06F 21/6254 |
| | | | 704/235 |
| 2013/0325441 A1 | 12/2013 | Levien et al. | 704/9 |
| 2013/0325452 A1* | 12/2013 | Levien | G10L 15/065 |
| | | | 704/201 |
| 2013/0325453 A1* | 12/2013 | Levien | G10L 21/00 |
| | | | 704/201 |
| 2014/0278366 A1* | 9/2014 | Jacob | G10L 15/30 |
| | | | 704/235 |
| 2018/0005626 A1* | 1/2018 | Betley | G10L 15/063 |
| 2018/0321905 A1* | 11/2018 | Fountaine | G06F 3/165 |
| 2019/0020761 A1* | 1/2019 | Golden | H04M 3/4938 |
| 2019/0103103 A1* | 4/2019 | Ni | G10L 15/22 |
| 2019/0139548 A1* | 5/2019 | Dillard | H04K 1/02 |
| 2019/0180759 A1* | 6/2019 | Fountaine | G10L 17/00 |
| 2021/0043332 A1* | 2/2021 | Rohrbacher | G06F 3/167 |
| 2021/0335337 A1* | 10/2021 | Gkoulalas-Divanis | |
| | | | G10L 15/26 |

OTHER PUBLICATIONS

Office Action for DE Application No. 10 2018 202 018.3, 7 pages, Oct. 12, 2018.
Carlini Nicholas et al: "Hidden Voice Comuands", This Paper is Included in the Proceedings of the 25th USENIX Security Symposium; Aug. 10-12, vol. 8275, pp. 513-530, XP055460530, Berlin, Heidelberg, DOI: 10.1007/978-3-642-45065-5; ISBN: 978-3-642-45064-8; Abstract; Chapture 3.2, Figure 2.
Shufei He: "Speaker De-identification for Privacy Protection", XP055499092, London, England; Gefunden im Internet: URL:http://ctoresearch.irdeto.com/materials/shufei_1st_year_report.pdf; [gefunden am-Aug. 10, 2018]; Abstract, Chapture 1.2, 2.2, 3.2.2, 3.3 (point 2, 4, 5).
Chinese Office Action, Application No. 201980012359.1, 7 pages, Feb. 23, 2023.

* cited by examiner

METHOD AND SYSTEM FOR PROVIDING A SPEECH-BASED SERVICE, IN PARTICULAR FOR THE CONTROL OF ROOM CONTROL ELEMENTS IN BUILDINGS

CROSS-REFERENCE TO RELATED APPLICATIONS

This application is a U.S. National Stage Application of International Application No. PCT/EP2019/050945 filed Jan. 15, 2019, which designates the United States of America, and claims priority to DE Application No. 10 2018 202 018.3 filed Feb. 9, 2018, the contents of which are hereby incorporated by reference in their entirety.

TECHNICAL FIELD

The present disclosure relates to building control systems. Various embodiments of the teachings herein may include methods and/or systems for providing a speech-based service, in particular for the control of room control elements in buildings, computer-readable storage media and/or computer program product including instructions which, when they are executed by a computer, cause the computer to carry out a method for providing a speech-based service, in particular for the control of room control elements in buildings.

BACKGROUND

Intelligent audio devices such as, for example, Amazon Echo or Google Home, enable a user, in cooperation with suitable virtual assistants or speech assistants (e.g. Alexa from Amazon or Siri from Apple), to control devices connected thereto by means of speech instructions or speech commands. A speech instruction or a speech command or a sequence thereof is analyzed, evaluated and a brings about a corresponding reaction in the relevant device. E.g. "Switch on the light in the living room". The intelligent audio devices are devices which use an "Artificial Intelligence" engine software, which learns the behavior, habits and preferences of the user, and can thus also offer individually adapted proposals, solutions or actions for a user. This, however, demands the surrender of individual and person-related data by the user, which is typically processed, analyzed and stored in a person-related manner outside the sphere of control and influence of the user.

For reasons of data protection, the use of these intelligent audio devices is therefore possible only in private households or in private life, since the private person has himself decided for the use of this type of speech services within his own premises. In non-private households, e.g. businesses, however, the use of this type of speech control is extremely critical since as a rule, a plurality of persons use the service who have not given (nor, sometimes, would give) any formal consent for person-related use of their data.

SUMMARY

The teachings of the present disclosure described methods and systems which also enable the use of speech-based services in non-private households, e.g. businesses, while taking account of data protection. For example, some embodiments include a method for providing a speech-based service, in particular for the control of building infrastructure technology, the method comprising: receiving speech instructions by means of an audio device, wherein the audio device is configured to analyze the received speech instructions, to convert them into corresponding operating commands for the control of devices (e.g. field devices) and/or programs in a building and to pass them on to corresponding room control elements or directly to the respective building infrastructure technology; wherein before the evaluation of the speech instructions by a corresponding speech recognition service (e.g. an assistance service), the identity of the sender of the speech instructions is anonymized by a separate and trustworthy anonymization service. The anonymization allows, inter alia, the use of assistance services while maintaining data protection. By means of the anonymization, the identity of the actual inquirer is veiled, but without impairing the actual system control by speech. In some embodiments, the audio device serves as a proxy for the anonymization service.

As another example, some embodiments include a system for providing a speech-based service, in particular for the control of room control elements (RBE) in buildings, the system comprising: a trustworthy anonymization service which is configured to receive speech instructions of a sender and to convert them so that the identity of the sender of the speech instructions is anonymized, wherein the anonymization service is further configured to provide the anonymized speech instructions for an audio device, in particular a non-trustworthy audio device; and an audio device, in particular a non-trustworthy audio device for receiving the anonymized speech instructions, wherein the audio device is configured to analyze the received speech instructions, to convert them into corresponding operating commands for the control of devices (e.g. HVAC or field devices) and/or programs (e.g. programs for a building management station) in a building and to pass them on to these. The anonymization service can be realized, for example, in the audio device (if it can be classified as trustworthy) or on a trustworthy proxy arranged upstream of the corresponding virtual assistant (e.g. in the building itself or at a trustworthy service provider). The anonymization service can convert a received speech message (or a speech instruction) e.g. by means of a speech distortion into an anonymized speech message. However, it is also possible that a received speech message is converted by the anonymization service into an (advantageously internal) text. This text is then output by a speech generator of the anonymization service for the assistance service (e.g. Amazon Alexa). It is ensured by the anonymization that it is no longer possible to deduce the person who placed the original speech message (or the speech instruction).

As another example, some embodiments include a computer-readable storage medium which stores instructions which, when they are executed by a computer, cause the computer to carry out a method for providing a speech-based service, in particular for the control of devices or for the control of programs in a building, wherein the method comprises: providing an anonymization service which converts received speech instructions of a user so that the identity of the user of the speech instructions is anonymized, wherein the anonymization service outputs the anonymized speech instructions to an assistance service; and providing the assistance service for receiving the anonymized speech instructions, wherein the assistance service analyzes the received anonymized speech instructions, converts them into corresponding operating commands for controlling devices and/or for controlling programs in a building and passes them on thereto. Advantageously, the instructions are provided for implementing the method and/or the system on non-volatile computer-readable storage media or memory stores such as caches, buffers, RAM, removable storage media, hard disks, SD cards, CDs, USB storage sticks or other computer-readable storage media. The computer-readable storage media can be different types of volatile and non-volatile storage media. The functions or method steps that are described in the description and the drawings are carried out in reaction to one or more sets of instructions which are stored in or on a computer-readable storage medium. The functions or method steps are independent of the special type of command set, storage medium, processor or processing strategy and can be carried out by software, hardware, firmware and the like, alone or in combination.

BRIEF DESCRIPTION OF THE DRAWINGS

The teachings herein and some example embodiments thereof will now be described by reference to the accompanying drawings, in which.

DETAILED DESCRIPTION

Figure 1:
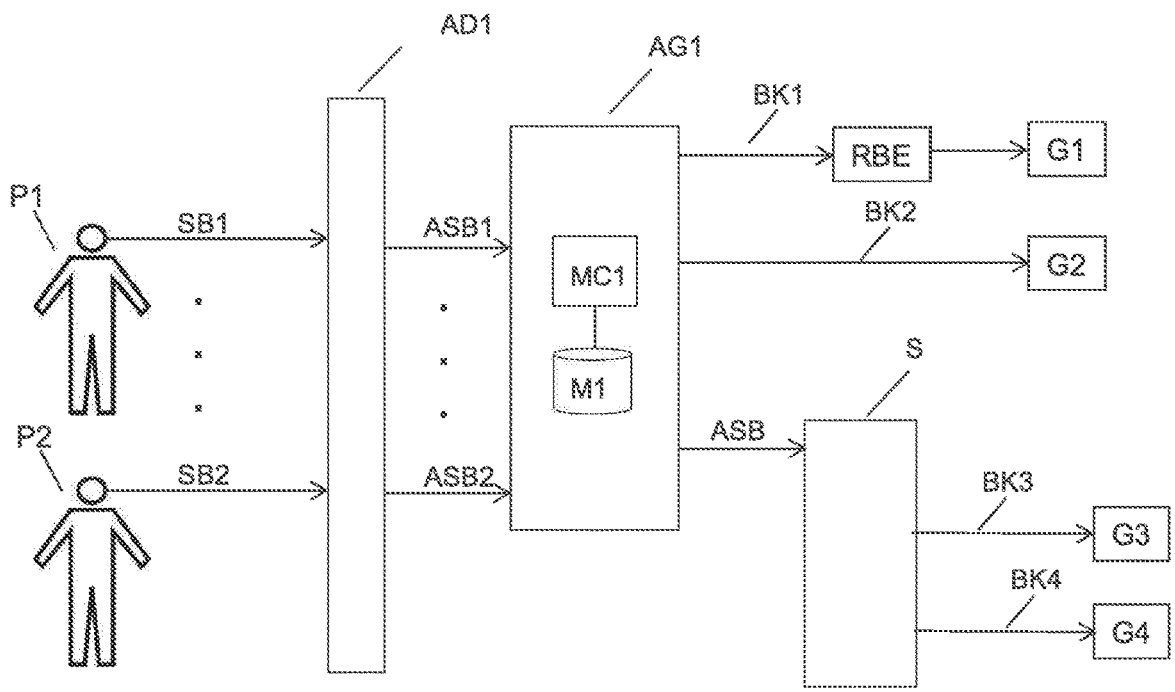
FIG. 1 shows a first exemplary system for providing a speech-based service, comprising an anonymization service incorporating teachings of the present disclosure.

In some embodiments, the anonymization of the received speech instructions can take place through the audio device itself or through a trustworthy server (e.g. a local server) connected to the audio device. The anonymized speech instructions can be accepted and analyzed by an external (possibly non-trustworthy) server and passed on as corresponding operating commands for controlling devices (e.g. field devices) or programs (e.g. programs of a building management station or a room control element).

In some embodiments, the anonymization takes place by means of a randomized speech alienation. This can take place, for example, by means of a distorter which brings about a deformation of the original speech command, which prevents a person-related association (e.g. by changing the vocal pitch and/or the speech speed). The randomized speech alienation can take place in the audio device, by means of corresponding hardware or software components. In principle, however, randomized speech alienation can also take place at any other trustworthy site before the relevant service provider or the virtual assistant (i.e. the relevant service which provides the digital speech analysis) is called upon. Randomized speech alienation brings about an increase in the entropy of the speech command issued by the user.

In some embodiments, the anonymization takes place such that a retraceability exists between the sender (user) and the anonymization service, but not between the sender and the audio device. The audio device and the corresponding provider of the virtual assistant thus cannot follow a received speech command back to the sender (user) and also cannot identify him. The sender (user) of a speech command is thus non-transparent to the audio device and the virtual assistant. The provider of the virtual assistant therefore cannot evaluate any person-related data of the user. Backtraceability exists only between the sender (user) and the anonymization service. Only the anonymization service connected upstream of the audio device and/or the virtual assistant is capable or configured to evaluate person-related data of the user or to give user-related vocal responses (e.g. feedback) relating to a respective speech command of the user. In these embodiments, the response or feedback is generated for a user of the anonymization service.

In some embodiments, the audio device, on the basis of the analysis of the received speech instructions, generates a feedback which is associated by the anonymization service with a dedicated sender. In these embodiments, the response or the feedback to a speech instruction is generated by the audio device or by the virtual assistant, but the association of the recognized speech instruction with its actual speaker is at most (and also only if explicitly desired) possible for the audio device or the trustworthy anonymization service, but not for the (non-trustworthy) virtual assistant/speech service provider.

In some embodiments, the anonymization service is realized on a correspondingly equipped mobile communication terminal of the user (sender). However, it is also possible to install the anonymization service, for example, by means of an app on a mobile communication terminal of the user. This can take place, for example, by means of a download from an internet platform of a corresponding service provider.

In some embodiments, the anonymization service is integrated into the audio device. Advantageously, in these embodiments, the audio device has previously been classified as trustworthy. In this embodiment, the anonymization service is embedded in the audio device. The anonymization service can be embedded, for example, in a corresponding processing logic (e.g. a microprocessor) of the audio device, for example, as software or as firmware.

In some embodiments, the anonymization service is realized as trustworthy network components (proxies) in a building communication network (e.g. installation bus, KNX), and wherein the audio device is a further trustworthy network component of the building communication network. A building automation system can thus very easily be provided or retrofitted with an anonymization service. The anonymization service is integrated into the infrastructure of the building communication network as a network component, e.g., by means of a radio connection.

In some embodiments, a computer program product contains instructions that are executable on a computer which, when they are executed by the computer, cause the computer to carry out a method for providing a speech-based service, in particular for the control of devices or for the control of programs in a building, wherein the method comprises: providing an anonymization service which converts received speech instructions of a user so that the identity of the user of the speech instructions is anonymized, wherein the anonymization service outputs the anonymized speech instructions to an assistance service; and providing the assistance service for receiving the anonymized speech instructions, wherein the assistance service analyzes the received anonymized speech instructions, converts them into corresponding operating commands for controlling devices and/or for controlling programs in a building and passes them on thereto. In some embodiments, the computer program product is configured as a library and/or as a program module of a further computer program product. The computer program product may be implemented by software or firmware in a suitable programming language. In some embodiments, the computer program product is embedded in a computer system or a computer-based infrastructure.

In order for digital intelligent personal assistants to function usefully and properly, the user of such services must reveal much personal data about himself. It is the responsibility of the individual to decide how much privacy he is prepared to give away. Particularly in the environment of non-independent work (e.g. at a workplace in a company), an employer must, e.g. for reasons of data security or employment law, take protective measures in this regard. If the employer acts too restrictively, the satisfaction level or acceptance of the employees falls. The employer must find a way to provide expected and accustomed comfort features, in this case speech-based digital assistants, without infringing his aims and obligations.

An intelligent personal assistant (IPA) (or speech assistant) is a piece of software which links, inter alia, speech recognition and analysis, the search for information or the handling of simple tasks and then the synthesis of natural speech responses. The aim is to enable an intuitive interface between a user and a system or device, so that commands or search queries can be formulated "more humanly" (from Wikipedia). Known services from large providers are, for example, Microsoft Cortana, Amazon Alexa, Apple Siri, and Google Assistant. These services are currently used either via a communication terminal (e.g. a notebook, smartphone, tablet computer) or a dedicated assistant hardware item (e.g. Amazon Echo or Google Home).

A user transfers a command via speech and a hardware component of this type to a "backend" lying therebehind, e.g. an online transfer to one or more servers can take place. The speech instruction is analyzed there, evaluated, and a corresponding reaction to the command is generated. Such a reaction can be, for example, a speech response or a transferred action. As an example, the command "Switch on the light in the living room" is carried out. As a reaction to this command, the server lying therebehind can send a control command to the room control element associated with the inquirer ID, e.g. a linked lamp control unit. In order for this to be possible on the part of the service provider, he must know from whom exactly the command is coming. The room control element given in the example is also linked to this identity.

The so-called "Artificial Intelligence Engine" (e.g. AI software such as a neural network) of the service provider learns behavior, habits, preferences of the users and can thus offer individually adapted proposals, solutions or actions. For the service providers, the users are transparent consumers. Here also, data protection and privacy are surrendered in favor of a gain in personal comfort. However, whatever is possible and permitted in the private domain (e.g. in a person's own house or flat) is prohibited in a business (in particular, one having a plurality of employees) due to legal and/or internal regulations, since for example, confidential business data can be transferred via an intelligent personal assistant (IPA).

FIG. 1 shows a first exemplary system for providing a speech-based service incorporating teachings of the present disclosure, in particular for the control of room control elements RBE in buildings. The system according to FIG. 1 comprises an anonymization service AD1 which is configured to receive speech instructions SB1, SB2 of a sender (user) P1, P2 and to convert them so that the identity of the sender (user) P1, P2 of the speech instructions SB1, SB2 is anonymized, wherein the anonymization service AD1 is further configured to provide the anonymized speech instructions ASB, ASB1, ASB2 for an audio device AG1 and/or to send them to an audio device AG1 (e.g. Amazon Echo). Furthermore, the system according to FIG. 1 comprises an audio device AG1 (e.g. Amazon Echo/Alexa; digital assistance services) for receiving the anonymized speech instructions ASB1, ASB2 wherein the audio device AG1 is configured to analyze the received speech instructions ASB1, ASB2 (NLP—natural language processing) into corresponding operating commands BK1-BK4 for room control elements RBE for controlling HVAC devices (e.g. field devices, actuators) G1-G4 in a building and to pass them on to the corresponding room control elements RBE or directly to the HVAC devices G1-G4 (e.g. actuators for comfort control in a building).

HVAC devices G1-G4 can be, for example: heating, ventilation systems, air-conditioning systems, lighting systems, dimmers, drives for window blinds). Room control elements RBE are, for example, room devices or control devices for operating, regulating or controlling comfort variables (e.g. temperature, light, dazzle control) in a room. By means of the anonymization service AD1, the speech instructions SB1, SB2 of the user P1, P2 are anonymized, e.g. through speech distortion or by converting the speech instructions SB1, SB2 into a manufactured, fictional speech (e.g. the speech output from a navigation device). The anonymization service AD1 is equipped for this accordingly, i.e. with corresponding hardware and software.

The non-trustworthy audio device AG1 comprises suitable interfaces for receiving the anonymized speech instructions ASB1, ASB2. Optionally, the audio device AG1 comprises mechanisms for analyzing the speech instruction ASB1, ASB2 and for generating corresponding operating commands BK1-BK4 for controlling devices or programs (e.g. HVAC or field devices) in a building with the respective operating commands BK1-BK4. The operating commands BK1-BK4 can be transferred directly by the audio device AG1 to the respective HVAC devices, e.g. over a suitable radio connection (e.g. WLAN, Bluetooth). The operating commands BK1-BK4 can, however, also be transferred by the audio device AG1 to corresponding room control elements RBE. The corresponding room control elements RBE pass on the operating commands BK1-BK4 to the respective HVAC devices, e.g. via a suitable radio connection (e.g. WLAN, Bluetooth). For this purpose, the audio device AG1 is equipped with suitable hardware (e.g. a processor MC1 and a memory store M1) for carrying out corresponding processing logic and corresponding software (e.g. AI programs, neural networks, deep learning algorithms). The memory store M1 can be, for example, a speech cache which comprises standardized or frequently used speech instructions which are then used for anonymization.

In some embodiments, the anonymized speech instructions ASB can be passed on by the audio device AG1 to a server S. The server S comprises suitable hardware and software for analyzing the speech instructions ASB and for generating corresponding operating commands BK3, BK4 for controlling the corresponding HVAC devices G3, G4 with the respective operating commands BK3, BK4. In some embodiments, the audio device AG1 and the server S comprise an "Artificial Intelligence" engine (e.g. AI software, such as a neural network).

In some embodiments, the anonymization service AD1 is realized as network components (proxy) in a building communication network (e.g. installation bus, KNX), and the audio device AG1 is a further network component of the building communication network. A building automation system can thus very easily be provided or retrofitted with an anonymization service. In some embodiments, the anonymization service AD1 and the audio device AG1 are integrated into the infrastructure of the building communication network as network components (network nodes; e.g. as BacNet objects), e.g., by means of a radio connection.

Figure 2:
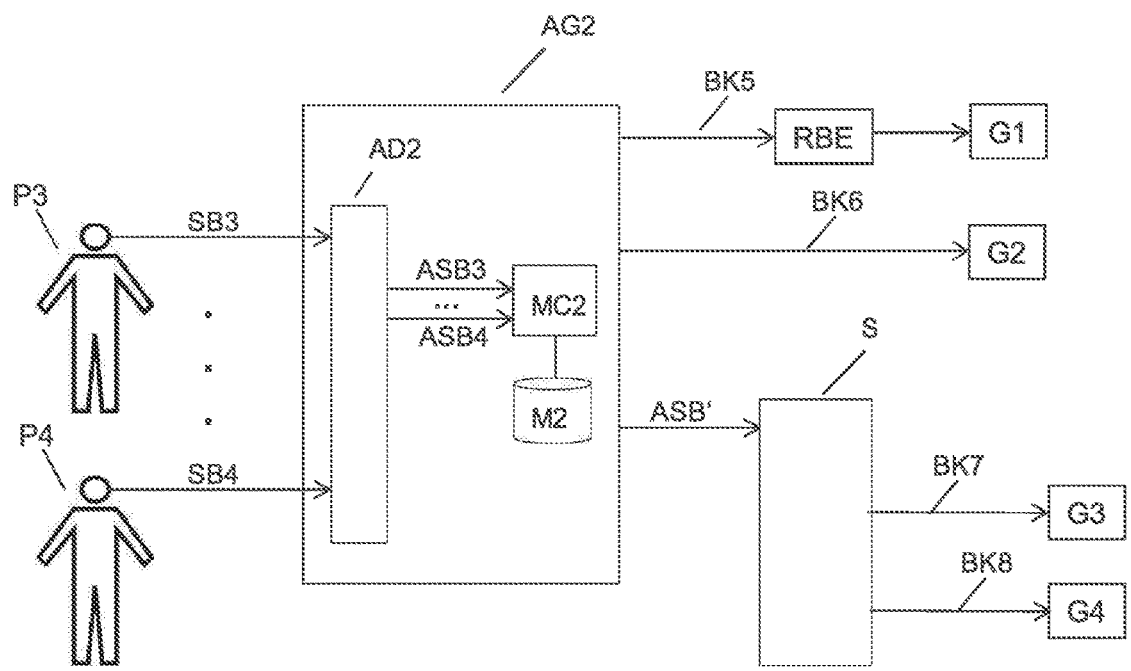
FIG. 2 shows a second exemplary system for providing a speech-based service, comprising an anonymization service incorporating teachings of the present disclosure.

FIG. 2 shows a second exemplary system for providing a speech-based service incorporating teachings of the present disclosure, in particular for the control of room control elements RBE in buildings. The system according to FIG. 2 comprises an anonymization service AD2 which is configured to receive speech instructions SB3, SB4 of a sender (user) P3, P4 and to convert them so that the identity of the respective sender (user) P3, P4 of the speech instructions SB3, SB4 is anonymized, wherein the anonymization service AD2 is further configured to provide the anonymized speech instructions ASB', ASB3, ASB4 for an audio device AG2 (e.g. Amazon Echo). In the exemplary system according to FIG. 2, the anonymization service AD2 is integrated into the trustworthy audio device AG2, e.g. as a hardware and/or software component of the audio device AG2 (e.g. Amazon Echo/Alexa; digital assistant services). In some embodiments, the audio device AG2 is configured to analyze the anonymized speech instructions ASB3, ASB4 (with NLP—natural language processing) and to convert them into corresponding operating commands BK5-BK8 for controlling devices (e.g. HVAC devices, field devices, actuators) G1-G4 in a building and to pass the operating commands BK5-BK8 on to the corresponding room control elements RBE or directly to the HVAC devices G1-G4 (e.g. actuators for comfort control in a building) or to other recipients.

In some embodiments, the anonymized speech instructions ASB' can be passed on by the trustworthy audio device AG2 to a trustworthy server S. The server S comprises suitable hardware and software for analyzing the speech instructions ASB' and for generating corresponding operating commands BK7, BK8 for controlling the corresponding HVAC devices G3, G4 with the respective operating commands BK7, BK8. In some embodiments, the audio device AG2 and the server S comprise an "Artificial Intelligence" engine (e.g. AI software, such as a neural network).

In some embodiments, the audio device AG2 is equipped with suitable hardware (e.g. a processor MC2 and a memory store M2) for carrying out corresponding processing logic and corresponding software (e.g. AI programs, neural networks, deep learning algorithms). The memory store M2 can be, for example, a speech cache which comprises standardized or frequently used speech instructions which are then used for anonymization.

In some embodiments, the integration of the anonymization service AD2 in the audio device AG2 enables the audio device AG2 to be operated and used with the anonymization service AD2 as a component. This simplifies, inter alia, the installation in a building but is based on the assumption that AG2 is a trustworthy device in the sense that the operation of the anonymization layer AD2 is separated from the operation of the speech analysis service.

Figure 3:
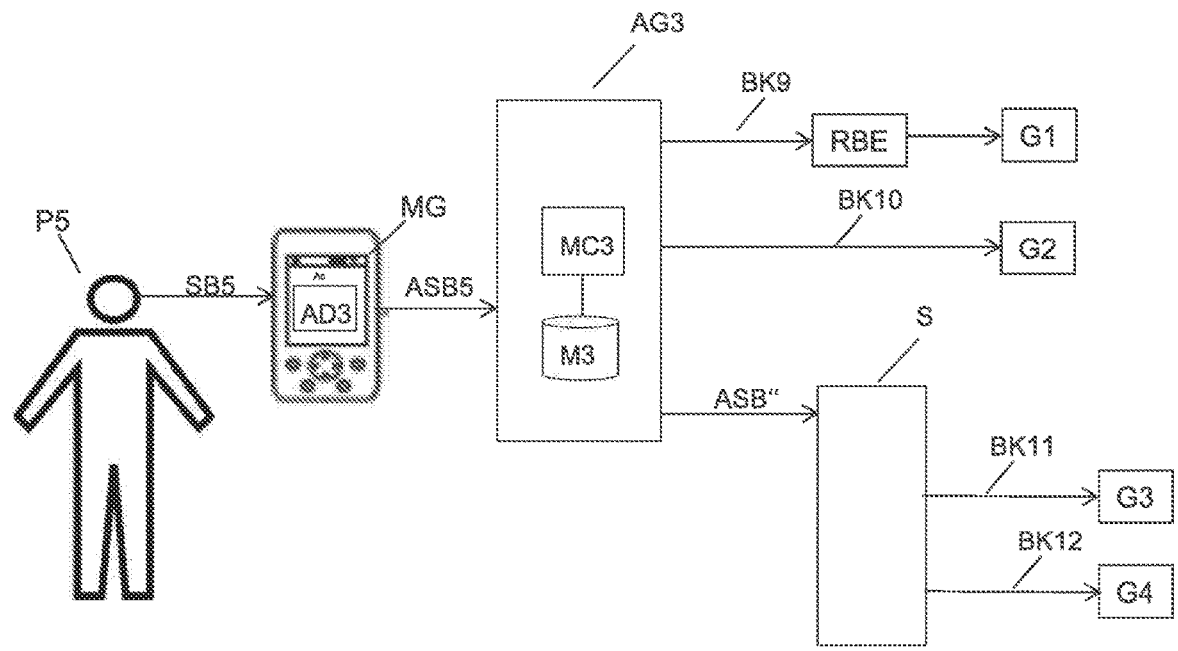
FIG. 3 shows a third exemplary system for providing a speech-based service, comprising an anonymization service incorporating teachings of the present disclosure.

FIG. 3 shows a third exemplary system for providing a speech-based service incorporating teachings of the present disclosure, in particular for the control of room control elements RBE in buildings. The system according to FIG. 3 comprises an anonymization service AD3 which is configured to receive speech instructions SB5 of a sender (user) P5 and to convert them so that the identity of the respective sender (user) P5 of the speech instructions SB5 is anonymized, wherein the anonymization service AD3 is further configured to provide the anonymized speech instructions ASB5 for an audio device AG3 (e.g. Amazon Echo). In the exemplary system according to FIG. 3, the anonymization service AD3 is realized on a correspondingly equipped mobile communication terminal MG (e.g. smartphone, tablet computer) of the user (sender) P5. For example, as an app which has been downloaded and installed with a corresponding download from the Internet to the communication terminal MG.

The user P5 speaks a speech instruction SB5 (e.g. "raise the temperature 3 degrees") and this speech instruction SB5 is acquired by the microphone of the communication terminal MG, converted by the anonymization service AD3 into an anonymized speech instruction ASB5, e.g. by means of a speech distortion. The non-trustworthy audio device AG3 is configured to analyze the anonymized speech instructions ASB5 (with NLP—natural language processing), to convert them into corresponding operating commands BK9-BK12 (e.g. a digital representation of an instruction) for room control elements RBE for controlling HVAC devices (e.g. field devices, actuators) G1-G4 in a building and to pass the operating commands BK9-BK12 on to the corresponding room control elements RBE or directly to the HVAC devices G1-G4 (e.g. actuators for comfort control in a building).

In some embodiments, the audio device AG3 is equipped with suitable hardware (e.g. a processor MC3 and a memory store M3) for carrying out corresponding processing logic and corresponding software (e.g. AI programs, neural networks, deep learning algorithms). The memory store M3 can be, for example, a speech cache which comprises standardized or frequently used speech instructions which are then used for anonymization. In some embodiments, the anonymized speech instructions ASB" can be passed on by the audio device AG3 to a server S. The server S comprises suitable hardware and software for analyzing the speech instructions ASB" and for generating corresponding operating commands BK11, BK12 for controlling the corresponding HVAC devices G3, G4 with the respective operating commands BK11, BK12.

Figure 4:
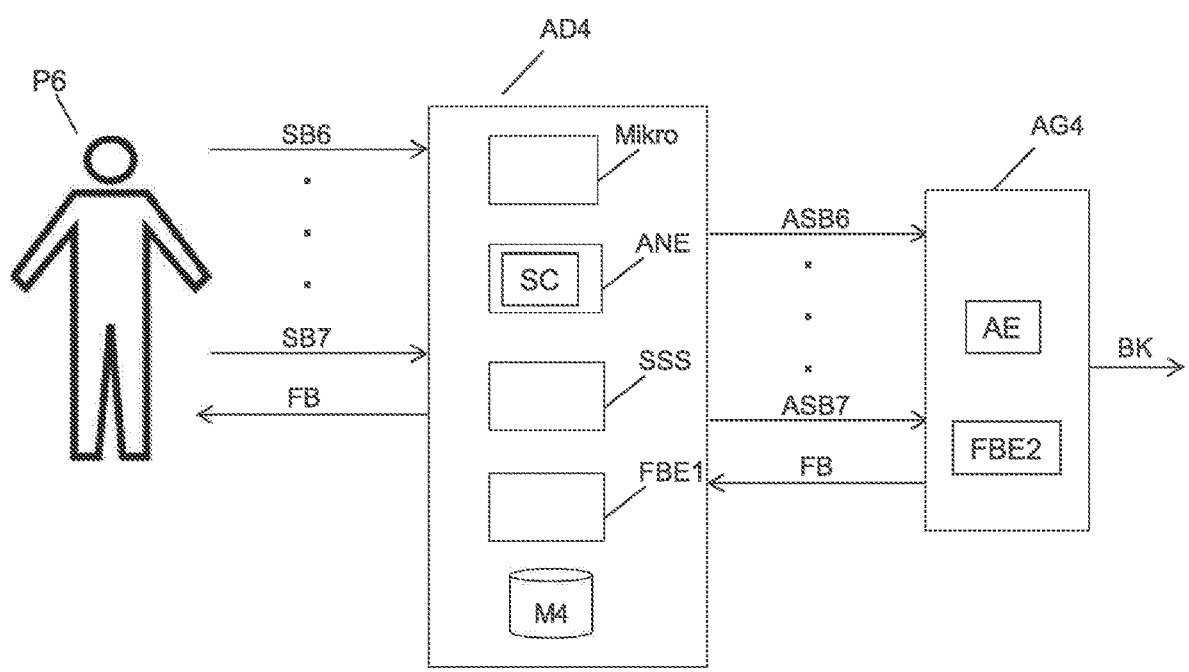
FIG. 4 shows an exemplary anonymization service incorporating teachings of the present disclosure.

FIG. 4 shows an exemplary anonymization service AD4 incorporating teachings of the present disclosure. An anonymization service or anonymization layer AD4 can be realized by means of corresponding hardware, software or firmware. In some embodiments, the anonymization service or the anonymization layer AD4 acts as a proxy which is connected upstream of an audio device AG4 (e.g. Amazon Echo), and which provides and/or passes on a received speech instruction SB6-SB7 for the audio device AG4 in an anonymized form. The anonymization service AD4 comprises a correspondingly configured processor (e.g. microprocessor) with corresponding processing logic (software programs) in order to provide its services. In some embodiments, the anonymization service is connected upstream of the speech analysis layer and is operated separately from the speech analysis layer.

In some embodiments, the user P6 issues speech instructions SB6, SB7 which are acquired by the microphone Mikro (e.g. a commercially available microphone) of the anonymization service AD4 and is anonymized by the anonymization unit ANE of the anonymization service AD4, so that no reference back to the user P6 is possible. The anonymization unit ANE can be realized, for example, as a voice distorter. However, the anonymization unit ANE can also convert the speech instructions SB6, SB7 of a user P6 into a constructed, fictional speech, for example, by a randomized replacement of words which are advantageously provided in a speech cache SC of the anonymization unit ANE. The speech cache SC can be held in the anonymization unit ANE or in the memory store SC.

In some embodiments, the speech instructions SB6, SB7 to be anonymized by the anonymization unit ANE are provided by the anonymization service AD4 via a correspondingly configured transmission interface SSS to the audio device AG4 (e.g. Amazon Echo) and the corresponding assistance service (e.g. Amazon Alexa) as anonymized speech instructions ASB6, ASB7 and/or passed on, for example, by a suitable communication connection, e.g., via a wireless communication connection (e.g. NFC, Bluetooth, WLAN).

In some embodiments, the audio device AG4 (e.g. Amazon Echo) or the corresponding assistance service (e.g. Amazon Alexa) comprises an analysis engine AE in order to analyze the anonymized speech instructions ASB6, ASB7 (e.g. by NLP—natural language processing) and to generate the corresponding operating commands BK for controlling devices or programs (e.g. HVAC or field devices) in a building. The analysis engine AE thus carries out a syntactical and semantic analysis of the anonymized speech instructions ASB6, ASB7 and comprises a generator for generating the corresponding operating commands BK for controlling and influencing the field devices (e.g. for control of the light or the heating). In some embodiments, the user P6 is given feedback FB on his speech instructions SB6, SB7, wherein it is ensured that the audio device AG4 (e.g. Amazon Echo) or the corresponding assistance service (e.g. Amazon Alexa) can draw no conclusions about the feedback recipient, i.e. the user.

In some embodiments, the feedback FB can be, for example, a speech message or an indication or text message on a display mounted on the audio device AG4. The feedback FB can be pure information (e.g. "Current room temperature 20 degrees") or a recommendation for the user P6 by evaluation of his earlier speech instructions SB6, SB7. The evaluation takes place in a feedback unit FBE1, FBE2 by methods of artificial intelligence (e.g. deep learning, neural networks). In some embodiments, the feedback unit FBE1, FBE2 also uses historical data which is placed, for example, in the memory store M4. The feedback unit FBE1, FBE2 can be located in the anonymization service AD4 and/or in the audio device AG4. If the feedback FB is provided by the audio device AG4, the anonymization service AD4 provides, independently of the audio device AG4 and independently of the assistance service, for a dedicated association of the feedback FB with the respective user P6. This can take place by evaluation of metainformation (e.g. features relating to syntax, word selection, frequency spectrum) from the speech instructions.

In some embodiments, a singularization of the speech instructions SB6, SB7 takes place by means of the anonymization service AD4. I.e. the speech instructions SB6, SB7 of a mass (number) of users are associated with a user group. E.g. speech instructions SB6, SB7 of each user P are carried out in the name of a particular group of users (e.g. a particular department), regardless of how many individual users are involved. The reverse association always takes place in relation to this group and not in relation to the individual user who has issued a speech instruction. A use of an assistance service of this type (e.g. Amazon Alexa) within a business is possible, although it would actually be prohibited for data security reasons.

Figure 5:
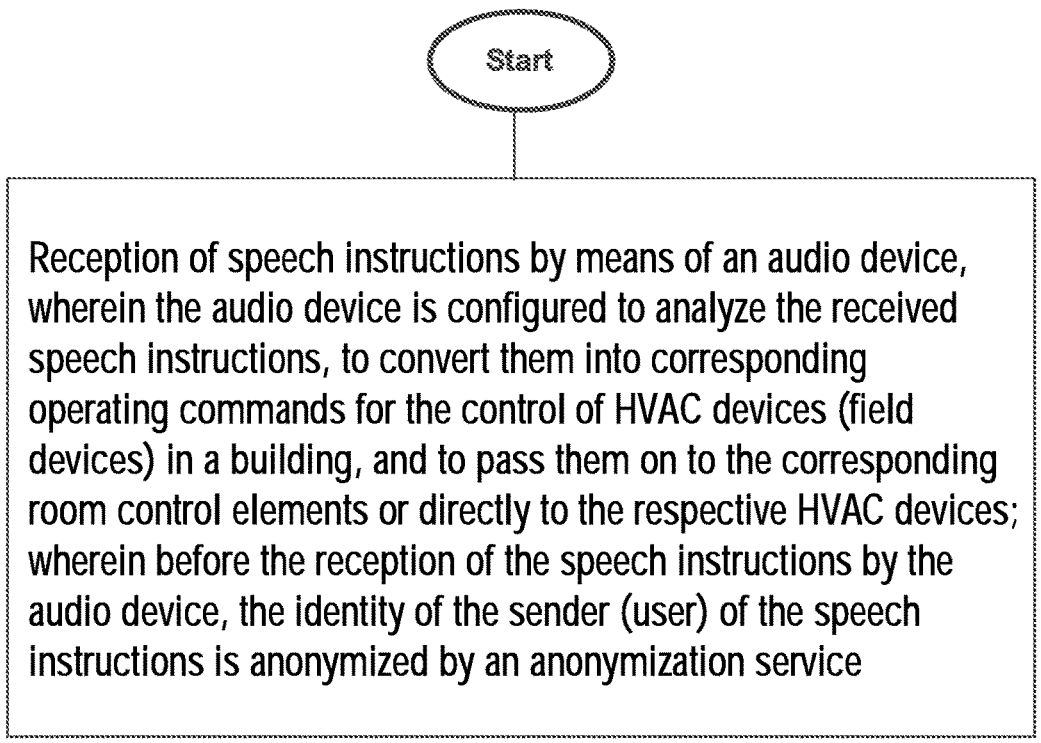
FIG. 5 shows an exemplary flow diagram for a method for providing a speech-based service, comprising an anonymization service incorporating teachings of the present disclosure.

FIG. 5 shows an exemplary flow diagram for a method for providing a speech-based service incorporating teachings of the present disclosure, comprising an anonymization service. The method is suitable, in particular, for the control of room control elements in buildings. The method comprises:

(VS1) Receiving speech instructions by means of an audio device, wherein the audio device is configured to analyze the received speech instructions (by NLP—natural language processing), to convert them into corresponding operating commands for the control of devices (e.g. HVAC or field devices) and/or programs (e.g. programs of a building management station) in a building and to pass them on to corresponding room control elements or directly to the respective building infrastructure technology;

wherein before the evaluation of the speech instructions by a corresponding speech recognition service (an assistance service, e.g. Amazon Alexa), the identity of the sender (user) of the speech instructions is anonymized by a separate and trustworthy anonymization service.

In some embodiments, the anonymization service can be realized, for example, in the audio device or on a proxy arranged upstream of the corresponding virtual assistant (e.g. Amazon Alexa). By means of the audio device (e.g. Amazon Echo), an assistance service (e.g. Amazon Alexa) is activated which generates the corresponding commands for the HVAC devices or field devices in order to bring about a comfort control (e.g. temperature control, light control) in a room or a building. In some embodiments, the anonymization takes place by means of a randomized speech alienation, e.g. based on words, sentences or sentence parts provided from a speech cache. In some embodiments, the anonymization takes place such that retraceability exists between the sender and the anonymization service, but not between the sender and the audio device.

In some embodiments, on the basis of the analysis of the received speech instructions, a feedback which is associated by the anonymization service with a dedicated sender is generated in the audio device. In some embodiments, the method is realized by a corresponding computer-supported system (e.g. a microcomputer) which is implemented in the audio device. In some embodiments, the anonymization service can however also be realized on a mobile communication terminal (e.g. a smartphone, tablet computer) of a user.

Features and advantages of the present disclosure for the systems, the methods, and the computer program product or the computer-readable storage medium may include, but are not limited to or by:

By use of an anonymization layer, employees can also use assistance services of service providers/third party providers (e.g. Amazon Echo, Alexa) on hardware provided (communication terminals or other dedicated hardware for the use of digital assistants) in a data protection-ensuring manner for use in the working environment. An anonymization layer-providing software/app can also be used on hardware (e.g. a smartphone) not provided by the employer. Such an anonymization layer (software) can be situated either on the communication terminal, on an interposed device or within the server landscape of the employer or a contracted service provider. The anonymization allows the use of assistance services such as, for example, Amazon Alexa, while maintaining data protection. So that an individual inquiry can be answered, the inquiry identity and/or the inquirer identity is anonymized in the direction of the assistance service. When the assistance service responds, the answer is directed to the actual user so that a targeted response/reaction is possible.

In some embodiments, the anonymization service therefore asks as a "proxy" for the actual inquirer (user) and thereby veils his identity. The trust relationship is thereby initially only displaced (the final user must now trust the proxy instead of the service provider), but this is a decisive difference:

Such "proxies" can be under the direct control of the final customer himself; or under the control of a partner who the final customer trusts.

Furthermore, all devices of a location are both locally networked and also ever more strongly connected to regional, national or even global data centers. These themselves are either data centers belonging to final customers or those of trusted partners of the final customer. Since the proxy appears as one instance in relation to the service provider, the anonymity in relation to the service provider is all the better the larger is the "pool" of inquirers.

For most application cases in the building environment, it is immaterial which person gives the speech instruction. The actual person can therefore already be replaced locally by an abstract person. This can be made, for example:

Intentionally loss-laden and therefore no longer reversible (e.g. by a randomized speech alienation directly in the device or on each other site before the service provider is called upon);

Intentionally alienated but locally reversible (as before, but the randomized instance holds the connection locally to the inquirer): This permits personal profiles, which are known only to the proxy and not to the service provider;

In both the aforementioned cases, the actually inquiring person can remain anonymous since he can (=if he wishes to) identify himself to the speech-controlled device, but does not have to: As mentioned, the action is ultimately carried out conceptually for an entity of a building (e.g. a room), not for a user.

The anonymization degree of such a proxy approach can be increased by further measures:

Mixes: The proxy inquires randomly from more than one service provider. Or the inquiries are mixed with proxies from other trusted partners. In both cases, the entropy increases, which makes traceability by the service provider(s) more difficult;

Caching: The probability that the same control commands are issued is enormously increased both over time and also over the set of networked buildings.

A speech cache (see FIG. 4) can with a high probability learn a majority of the speech instructions and can take them directly from the cache rather than having to ask the service provider. Not only does this increase the anonymity, but naturally also increases the performance of the system. Furthermore, the costs can thereby also be optimized, since speech service providers typically charge for their services according to the number of inquiries made;

Speech caches (see FIG. 4) can be aligned with one another (anonymously): Since speech instructions very often correlate to building structures, the recognition rate can be enormously improved. Firstly, because the proxy knows where the instruction has been placed (e.g. blind control instructions are only placed in rooms in which there are blinds in front of the windows; conversely, a system may naturally also expect—in each room where there are blinds in front of the windows—speech instructions for them). Secondly, because in similar entities of a building (e.g. "rooms with blinds in front of the windows"), similar speech instructions are to be expected worldwide.

Anonymization of the inquiring service user (especially from the viewpoint of the service provider).

Possibility of forming logical user clusters: thus, for example, all assistance inquiries of a building could be grouped together under this "roof" for evaluation; this, in turn, enables an evaluation with regard to optimization potential (which is particularly often requested→would it be possible to offer this function by default to reduce inquiries?; "What is on the user's mind"→could assistance be provided here?); evaluation regarding individual buildings (so that then a user cluster forms from all the users within a building) and thus comparison possibilities between logical clusters.

By means of logical inquiry bundling, the intelligence (e.g. the relevant AI program, neural network) of the service provider can still learn the habits, i.e. become better and adjust to the user, without knowing the individual inquirer; the logical cluster, the structure, appears as a service user the AI engine accordingly learns the preferences etc. of this structure, e.g. a special building (corresponds to the sum of the inquiries coming from this cluster).

Possibility for using any/as many assistance services as wished under one surface (on the user side); thereby, depending on the inquiry/task, use of the best/most useful service without the actual user having to be concerned about it; thereby furthermore, a unique branding/UI on the part of the user is possible.

Possibility of performing a pre-parsing of the inquiry: for example, within the IT of the employer, the inquiry to the speech service placed by a user is investigated semantically before passing on to the actual service provider of the virtual assistance service. Depending upon the content/context of the inquiry, the corresponding "best" (these can also be monetary, contractual, etc. reasons and no limited to the quality of the result) AI service (i.e. the best virtual assistance service) is selected and the inquiry is routed to it. Herein, the possibility of "cluster anonymization" can also be made use of.

A further possibility of the data protection lies in a speech modulation being able to be carried out before the inquiry to an AI service (assistance service); thereby, the speech inquiry is altered, e.g. in pitch/modulation/speed (e.g. the speech of employee X is converted into synthetic speech).

A further possibility lies in performing speech recognition (speech to text) before the inquiry to the service provider, and transferring the recognized speech-to-text content to the service provider via interfaces (APIs). This implies a simple anonymization as well as transfer efficiency.

The use of the system described is also possible in the private sphere, and is not limited only to the business/commercial sphere.

The use of AI/speech assistants (e.g. Alexa from Amazon, Google Assistant, Google Now) from large commercial suppliers (Amazon, Google, etc.) in the commercial working environment while maintaining data protection-related conditions and precautions is possible.

REFERENCE CHARACTERS

P1-P6 User
MG Mobile device

S1-S7 Speech instruction
ASB1-ASB7, ASB, ASB', ASB" Anonymized speech instruction
BK1-BK12, BK Operating command
RBE Room control element
AD1-AD4 Anonymization service
AG1-AG4 Audio device
MC1-MC3 Processor
M1-M4 Memory store
Mikro Microphone
ANE Anonymization unit
AE Analysis engine
SSS Transmission interface
FBE1, FBE2 Feedback unit
SC Speech cache
FB Feedback
S Server
G1-G4 Device
VS1 Method step

What is claimed is:

1. A method for providing a speech-based service for control of a building management system including an audio device and a controller, the method comprising:
receiving speech instructions from a user by a trustworthy anonymization service;
removing identifying features from the speech instructions using the trustworthy anonymization service, wherein removing identifying features includes adding randomized speech alienation to increase an entropy value of the speech instructions;
providing the anonymized speech instructions to the audio device;
converting the anonymized speech instructions into corresponding operating commands for the controller using the audio device;
generating feedback with the controller and transmitting the feedback to the anonymization service; and
transmitting the operating commands on to corresponding room control elements or building infrastructure;
transmitting the feedback to the user from the anonymization service;
wherein the audio device comprises a processor and a memory storing a speech cache with standardized or frequently used speech instructions for use as anonymized instructions, wherein the speech instructions correlate to building structures;
wherein the user is identifiable by the anonymization service, but not identifiable by the audio device;
wherein the anonymization service acts as a proxy for the user, veiling the user's identity, wherein the proxy appears as one instance in relation to a provider of the anonymization service with increased entropy.

2. The method as claimed in claim 1, wherein removing identifying features allows retraceability between a person speaking the speech instructions and the anonymization service, but blocks retraceability between the person and the room control elements or building infrastructure.

3. The method as claimed in claim 1, further comprising generating feedback based at least in part on analysis of the received speech instructions, the feedback associated by the anonymization service with a dedicated sender.

4. A system for providing a speech-based service for a building management system, the system comprising:
a trustworthy anonymization service configured to receive speech instructions from a user and to generate anonymized speech instructions so an identity of the user is not associated with the instructions, wherein generating anonymized speech instructions includes randomized speech alienation to increase an entropy value of the speech instructions issued by the user;
an audio device to receive the anonymized speech instructions from the anonymization service to analyze the received speech instructions, to convert the instructions into corresponding operating commands for control of devices and/or programs in a building, and to transmit the commands to the devices and/or programs;
wherein the audio device comprises a processor and a memory storing a speech cache with standardized or frequently used speech instructions for use as anonymized instructions, wherein the speech instructions correlate to building structures;
wherein the audio device generates feedback for the user and transmits the feedback to the anonymization service;
wherein the anonymization service transmits the feedback to the user;
wherein removing identifying features allows retraceability between the user speaking the speech instructions and the anonymization service, but blocks retraceability between the user and the audio device;
wherein the anonymization service acts as a proxy for the user, veiling the user's identity, wherein the proxy appears as one instance in relation to a provider of the anonymization service with increased entropy.

5. The system as claimed in claim 4, wherein the anonymization service comprises a mobile communication terminal of the user.

6. The system as claimed in claim 4, wherein the anonymization service is integrated into the audio device.

7. The system as claimed in claim 4, wherein:
the anonymization service comprises trustworthy network components in a building communication network, and
the audio device comprises a further trustworthy network component of the building communication network.

8. A non-transitory computer-readable storage medium storing instructions which, when executed by a processor, cause the processor to execute a method for providing a speech-based service for a building management system, the method comprising:
providing an anonymization service converting received speech instructions from a user to anonymized speech instructions without a recognizable identity of the user, wherein converting the instructions includes randomized speech alienation to increase an entropy value of the speech instructions issued by the user;
analyzing the received anonymized speech instructions;
converting the received instructions into corresponding operating commands for the building management system;
transmitting the operating commands to the building management system;
generating feedback for the user at various elements of the building management system; and
transmitting the feedback to the user via the anonymization service;
wherein an audio device comprises a processor and a memory storing a speech cache with standardized or frequently used speech instructions for use as anonymized instructions, wherein the speech instructions correlate to building structures;
wherein converting the received speech instructions allows retraceability between the user speaking the speech instructions and the anonymization service, but blocks retraceability between the user and the audio device;

wherein the anonymization service acts as a proxy for the user, veiling the user's identity, wherein the proxy appears as one instance in relation to the building management system with increased entropy.

\* \* \* \* \*